No. 801,544. PATENTED OCT. 10, 1905.
F. H. PERKINS.
SADDLE HORN.
APPLICATION FILED AUG. 29, 1904.
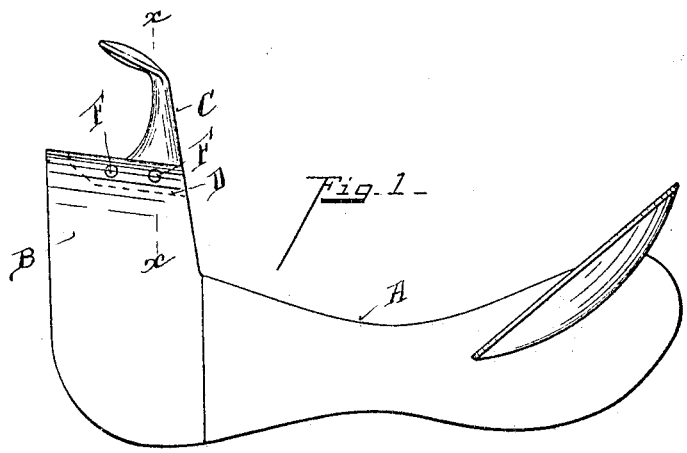
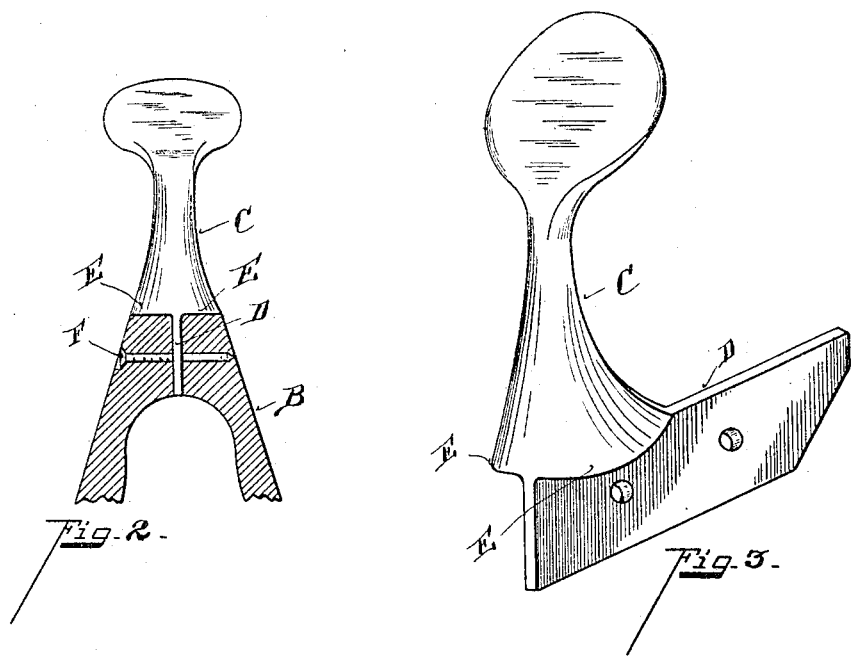
Witnesses
Oliver B. Kaiser
Leo O'Donnell
Inventor
Frank H. Perkins
By
Attorneys

UNITED STATES PATENT OFFICE.

FRANK H. PERKINS, OF COVINGTON, KENTUCKY.

SADDLE-HORN.

No. 801,544. Specification of Letters Patent. Patented Oct. 10, 1905.

Application filed August 29, 1904. Serial No. 222,529.

*To all whom it may concern:*

Be it known that I, FRANK H. PERKINS, a citizen of the United States, residing at Covington, in the county of Kenton and State of Kentucky, have invented certain new and useful Improvements in Saddle-Horns, of which the following is a specification.

My invention relates to an improved saddletree and horn.

The object of my invention is to do away with the expensive and forked legs, forming a part of the horn, and to make a cheaper saddle tree and horn.

The features of my invention are more fully set forth in the description of the accompanying drawings, forming a part of this specification, in which—

Figure 1 is a side elevation of my improvement. Fig. 2 is a section on line $x\ x$, Fig. 1. Fig. 3 is a perspective view of the saddle-horn and shank.

A represents the saddletree.
B represents the gullet.
C represents the horn.
D represents a shank formed integral of the horn, preferably made of malleable iron. The shank is projected forward and preferably extends a considerable distance in front of the base of the neck of the horn. E represents shoulders forming the base of the horn-neck and extending upon each side of said shank.

The arch of the gullet in the tree is slotted and mortised to receive the shank D, which seats therein. The arch or top surface of the gullet is flattened and forms a seat for the shoulders D of the horn, which seat thereon and make a firm base or support.

After the horn and its shank have been inserted in place then a number of holes are drilled through the gullet and horn-shank, and fastening nails or rivets F are inserted therein and firmly anchor the horn to the saddletree.

This form of construction makes a light and durable combined saddle tree and horn.

It is obvious that the shank may be made to extend the entire width of the gullet, obviating the mortising of the gullet and enabling the insertion of more fastening devices.

Having described my invention, I claim—

In combination with a saddletree, a horn, a shank projecting downwardly from and extending entirely across the face of the horn, and beyond the front portion thereof a substantial distance, the base of the horn upon each side of the shank forming shoulders, a gullet provided with seats for the said shoulders, an intermediate mortise for said shank, and a fastening passed transversely through the gullet and shank, substantially as described.

In testimony whereof I have hereunto set my hand.

FRANK H. PERKINS.

Witnesses:
OLIVER B. KAISER,
LEO O'DONNELL.